United States Patent
Huang et al.

(10) Patent No.: US 7,610,535 B2
(45) Date of Patent: Oct. 27, 2009

(54) BOUNDARY SCAN CONNECTOR TEST METHOD CAPABLE OF FULLY UTILIZING TEST I/O MODULES

(75) Inventors: Yu-Jen Huang, Taipei (TW); Chih-Hung Lin, Taipei County (TW)

(73) Assignee: Function Research Inc., Taipei (TW)

( * ) Notice: Subject to any disclaimer, the term of this patent is extended or adjusted under 35 U.S.C. 154(b) by 261 days.

(21) Appl. No.: 11/747,922

(22) Filed: May 14, 2007

(65) Prior Publication Data
US 2008/0270857 A1    Oct. 30, 2008

(30) Foreign Application Priority Data
Apr. 24, 2007    (TW)    ............... 96114423 A

(51) Int. Cl.
*G01R 31/309*    (2006.01)
*G01R 31/40*    (2006.01)

(52) U.S. Cl. ..................... 714/727; 714/724

(58) Field of Classification Search ............ None
See application file for complete search history.

(56) References Cited

U.S. PATENT DOCUMENTS

| | | | | |
|---|---|---|---|---|
| 5,481,474 | A | * | 1/1996 | Lee ............................. 716/9 |
| 5,487,074 | A | * | 1/1996 | Sullivan ..................... 714/727 |
| 2002/0147561 | A1 | * | 10/2002 | Baracat et al. ............. 702/119 |
| 2003/0041286 | A1 | * | 2/2003 | Boorom et al. ............. 714/30 |
| 2004/0037303 | A1 | * | 2/2004 | Joshi et al. ................. 370/419 |
| 2005/0125709 | A1 | * | 6/2005 | McKim et al. ............. 714/25 |

* cited by examiner

*Primary Examiner*—Kevin L Ellis
*Assistant Examiner*—Dipakkumar Gandhi
(74) *Attorney, Agent, or Firm*—Winston Hsu

(57)    ABSTRACT

Read the description file of a PCBA without determining and selecting connectors which might be relevant to boundary scan. The description file of the PCBA determines which pins of the connectors on the PCBA should correspond to the pins of a test I/O module. And use the wiring report generated by an auto test program generator to correspond the pins of the test I/O module to the pins of the connectors which are accessed by boundary scan. Thus the IC of the test I/O module would not have any unused pin between any two consecutive pins wired to the connectors of the PCBA.

6 Claims, 7 Drawing Sheets

BOUNDARY SCAN CONNECTOR TEST METHOD CAPABLE OF FULLY UTILIZING TEST I/O MODULES

BACKGROUND OF THE INVENTION

1. Field of the Invention

The present invention provides a boundary scan connector test method, and more particularly, to a boundary scan connector test method capable of fully utilizing test I/O modules.

2. Description of the Prior Art

After forming a printed circuit board, the printed circuited board has to be installed with a few integrated circuits to form a useful printed circuit board assembly (PCBA). And to ensure normal operations of the PCBA, the integrated circuits will be made with built-in boundary scan circuits, and pins for boundary scan so as to test if the integrated circuits on the PCBA can perform normally.

Please refer to FIG. 1. FIG. 1 is a perspective view of a PCBA 10 and a test input/output (I/O) module 12 according to the prior art. The PCBA 10 comprises two integrated circuits 14, 16 and three connectors 18, 20, 21. The test I/O module 12 comprises an integrated circuit 22 which can be a field programmable gate array (FPGA) or an erasable programmable logic device (EPLD).

In the prior art, a user has to determine and select connectors, or pins of connectors which may be relevant to boundary scan. If the user determines that on the PCBA 10, pins 24, 26, 28 of the integrated circuit 14 and pins 30, 32, 34, 36 of the integrated circuit 16 may be relevant to boundary scan, then the user will determine that the connector 18 is relevant to boundary scan, and the connectors 20, 21 are irrelevant to boundary scan. Or the user will determine that pins 38, 42, 46 of the connector 18 are relevant to boundary scan, and other pins of the connectors 18, 20, 21 are irrelevant to boundary scan. The description file of the PCBA 10 will correspond the pin 38 of the connector 18 to the pin 40 of the test I/O module 12, the pin 42 of the connector 18 to the pin 44 of the test I/O module 12, the pin 46 of the connector 18 to the pin 48 of the test I/O module 12. Then the description file of the PCBA 10 and the description file of the test I/O module 12 will be accessed together. And the mode of the PCBA 10 and test I/O module 12 will be set as the boundary scan mode to determine which pins on the PCBA 10 and test I/O module 12 are relevant to boundary scan. If the wiring report generated by executing an auto test program generator shows that the pins 24, 28 of the integrated circuit 14 and the pins 30, 34 of the integrated circuit 16 are used to perform boundary scan, and the pin 26 of the integrated circuit 14 and the pins 32, 36 of the integrated circuit 16 are not used to perform boundary scan, then the user will electrically connect the pin 38 of the connector 18 to the pin 40 of the integrated circuit 22, and the pin 46 of the connector 18 to the pin 48 of the integrated circuit 22, but will not electrically connect the pin 42 of the connector 18 to the pin 44 of the integrated circuit 22. Then digital signals can be input to the PCBA 10 through the test I/O module 12 to check if the PCBA 10 can function normally.

Please refer to FIG. 2. FIG. 2 is a flowchart of a prior art boundary scan connector test method 200. The method 200 comprises the following steps:

Step 210: a user determines and selects the connector 18 which may be relevant to boundary scan, or the pins 38, 42, 46 of the connector 18 which may be relevant to boundary scan;

Step 220: read the description file of the PCBA 10 and the description file of the test I/O module 12;

Step 230: set the boundary scan integrated circuit of the PCBA 10 to determine pins related to boundary scan on the PCBA 10;

Step 240: execute the auto test program generator to generate a wiring report;

Step 250: a user electrically connects the pins 40, 48 on the test I/O module 12 to the pins 38, 46 of the connector 18 on the PCBA 10 according to the wiring report;

Step 260: input digital signals to the PCBA 10 through the test I/O module 12 to check if the PCBA 10 can function normally.

In step 210, to ensure all pins which may be relevant to boundary scan are selected, instead of selecting pins which may be relevant to boundary scan, a user usually selects all connectors which include pins possibly relevant to boundary scan. Thus in FIG. 1, instead of selecting possible pins on the connector 18, a user may select the connector 18. When selecting the connector 18 instead of possible pins on the connector 18, all pins of the connector 18 are selected. At the very least, to ensure all pins possibly relevant to boundary scan are selected, the number of pins on the connector 18 selected by the user will exceed the number of pins actually relevant to boundary scan. However in step 220, the pins 38, 42, 46 of the connector 18 selected by the user is linked to the pins of the integrated circuit on the test I/O module 12 one by one, thus each of the selected pins 38, 42, 46 will correspond to one of the pins 40, 44, 48. When step 230 finds the pins 38, 46 of the connector 18 are related to boundary scan but the pin 42 is not, the pin 42 which is not related to boundary scan but was falsely selected as related to boundary scan will be included in the wiring report generated by step 240. And the wiring report will report that the pin 42 and pin 44 should not be electrically connected with any pin. Because the pin 44 is not to be electrically connected with any pin, the pin 44 is left idle and is wasted. In a worse case, if the user selected the connector 18 instead of selecting the pins 38, 42, 46 of the connector 18 in step 210, then all of the pins of the connector 18 would be determined as might be relevant to boundary scan. Then in the wiring report, a great number of pins of the connector 18 and a great number of pins on the test I/O module 12 will be reported as not needing electrical connections, causing a severe waste of test I/O module 12 resource.

Summary of the Invention

According to the first embodiment of the present invention, a boundary scan connector test method comprises accessing a description file of a printed circuit board assembly (PCBA), setting a boundary scan integrated circuit (IC) on the PCBA to determine pins related to boundary scan on the PCBA, providing a connector on the PCBA to be electrically connected with a test input/output (I/O) module, executing an auto test program generator to generate a wiring report, and after pins on the test I/O module and pins of the connector on the PCBA are electrically connected according to the wiring report, performing a boundary scan for the PCBA through the test I/O module to check if the PCBA is normal.

According to the second embodiment of the present invention, a boundary scan connector test method comprises accessing a description file of a printed circuit board assembly (PCBA), setting a boundary scan integrated circuit (IC) on the PCBA to determine pins related to boundary scan on the PCBA, providing connectors on the PCBA to be electrically connected with test input/output (I/O) modules of a Joint Test Action Group (JTAG) backplane, executing an auto test program generator to generate a wiring report and a hardware configuration report, a backplane controller of the JTAG backplane linking a plurality of test I/O modules on the JTAG backplane according to the hardware configuration report, and after pins on the linked test I/O modules and pins of the connectors on the PCBA are electrically connected according to the wiring report, performing a boundary scan for the PCBA through the linked test I/O modules to check if the PCBA is normal.

According to the third embodiment of the present invention, a boundary scan connector test method comprises accessing a description file of a printed circuit board assembly (PCBA), setting a boundary scan integrated circuit (IC) on the PCBA to determine pins related to boundary scan on the PCBA, providing connectors on the PCBA to be electrically connected with test input/output (I/O) modules of Joint Test Action Group (JTAG) backplanes, executing an auto test program generator to generate a wiring report and a hardware configuration report, a Multiple Scan Path Linker linking a plurality of JTAG backplanes, backplane controllers of the linked JTAG backplanes linking a plurality of test I/O modules on the linked JTAG backplanes according to the hardware configuration report, and after pins on the linked test I/O modules and pins of the connectors on the PCBA are electrically connected according to the wiring report, performing a boundary scan for the PCBA through the linked test I/O modules to check if the PCBA is normal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
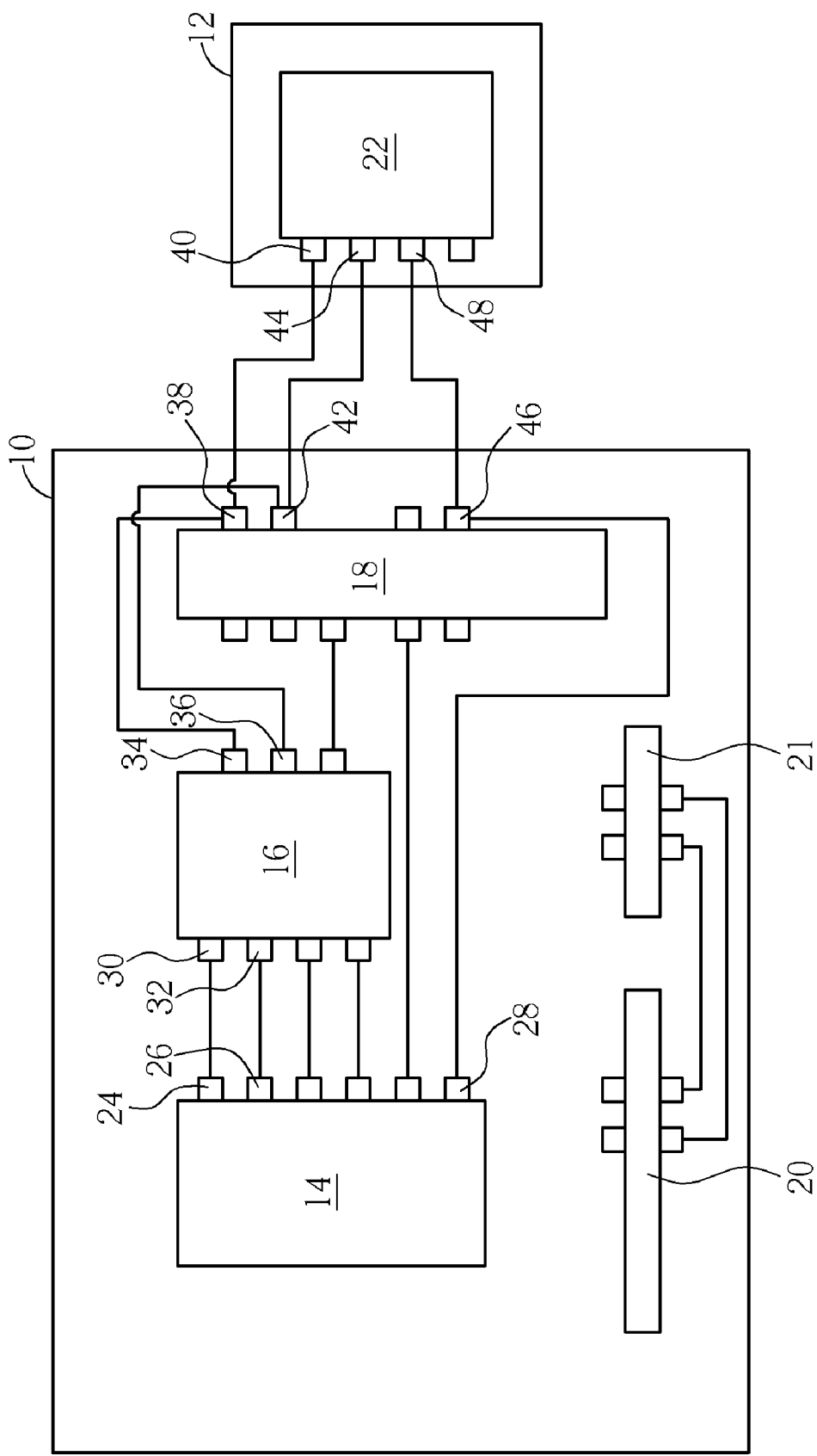
FIG. 1 is a perspective view of a PCBA and a test input/output (I/O) module according to the prior art.
Figure 2:
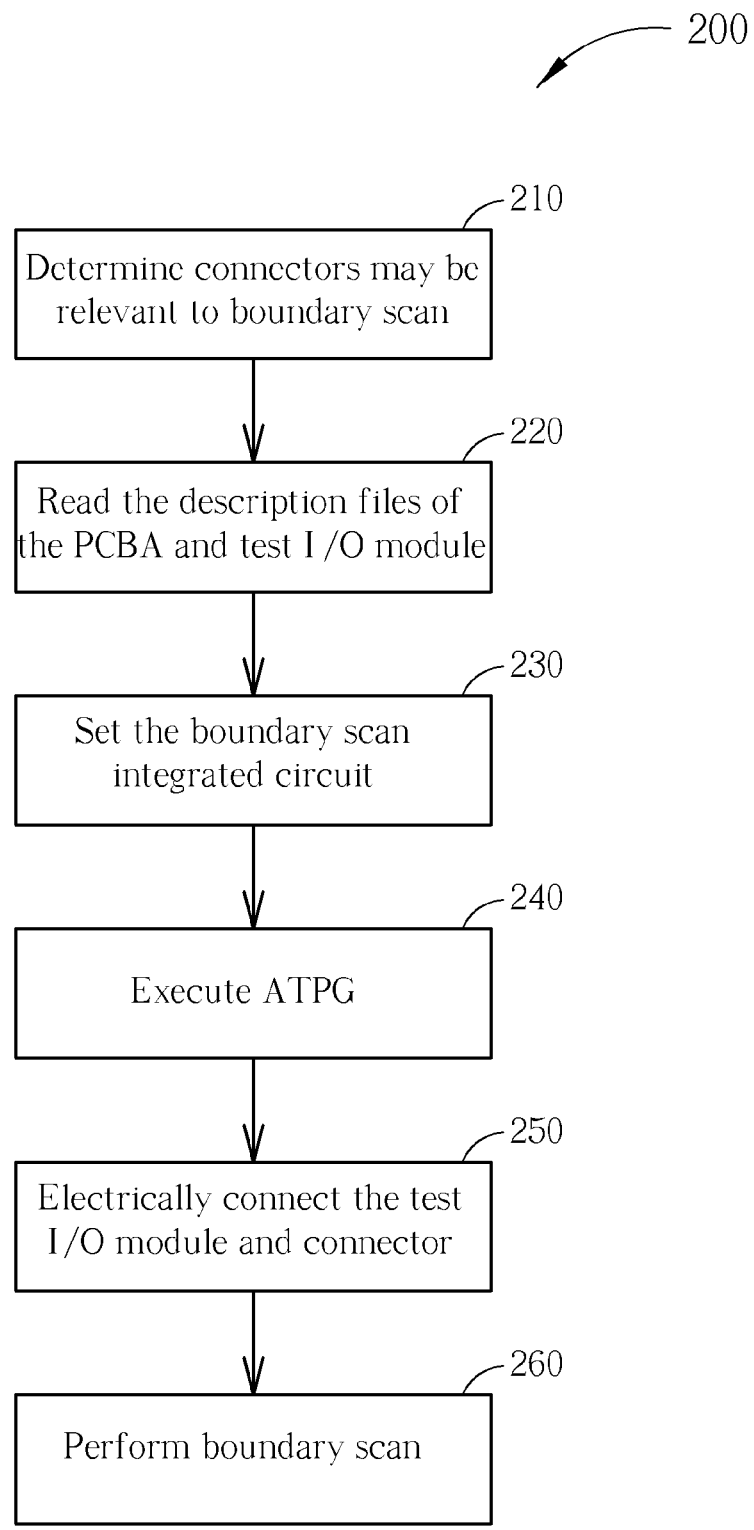
FIG. 2 is a flowchart of a prior art boundary scan connector test method.
Figure 3:
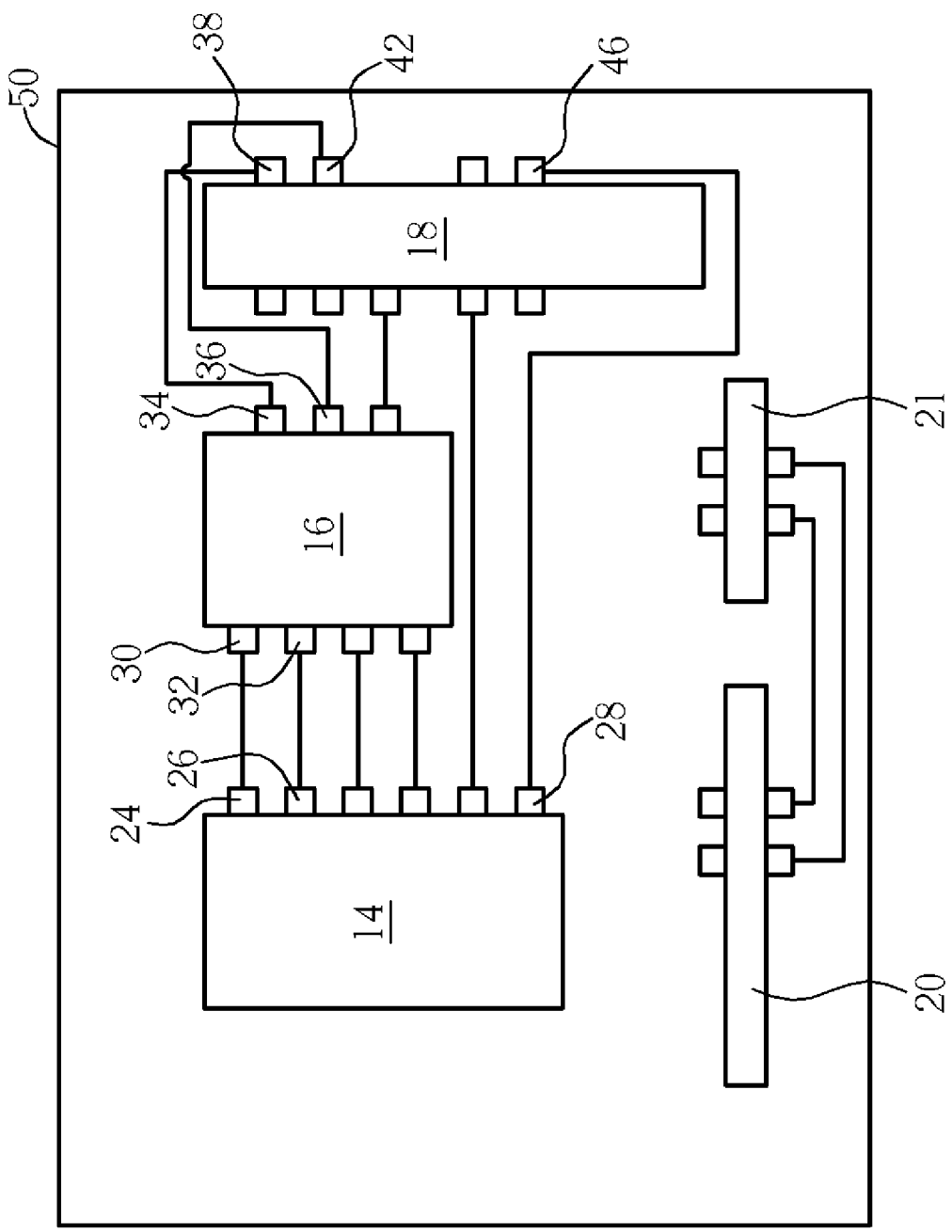
FIG. 3 is a perspective view of a PCBA according to an embodiment of the present invention.

Please refer to FIG. 3. FIG. 3 is a perspective view of a PCBA 50 according to an embodiment of the present invention. In this embodiment, a user does not need to determine and select connectors or pins of connectors which may be relevant to boundary scan ahead of time. All of the pins of connectors which may be relevant to boundary scan are determined by reading the description file of the PCBA 50. Thus when reading the description file of the PCBA 50, the description file of the test I/O module need not be read.

Further, two connectors 20, 21 should be electrically connected through traces when forming the PCBA 50 if their functions are to be tested while performing a boundary scan. When utilizing the PCBA 50, the two connectors 20, 21 can be directly inserted by an external card such as a 3G card. When reading the description file of the PCBA 50, the auto test program generator will determine that the pins of the connectors 20, 21 should be electrically connected to the test I/O module because the description file of the PCBA 50 describes the electrical connections between the two connectors 20, 21. Thus when performing the boundary scan, the two connectors 20, 21 will be tested as well to see if they can function normally.

Figure 4:
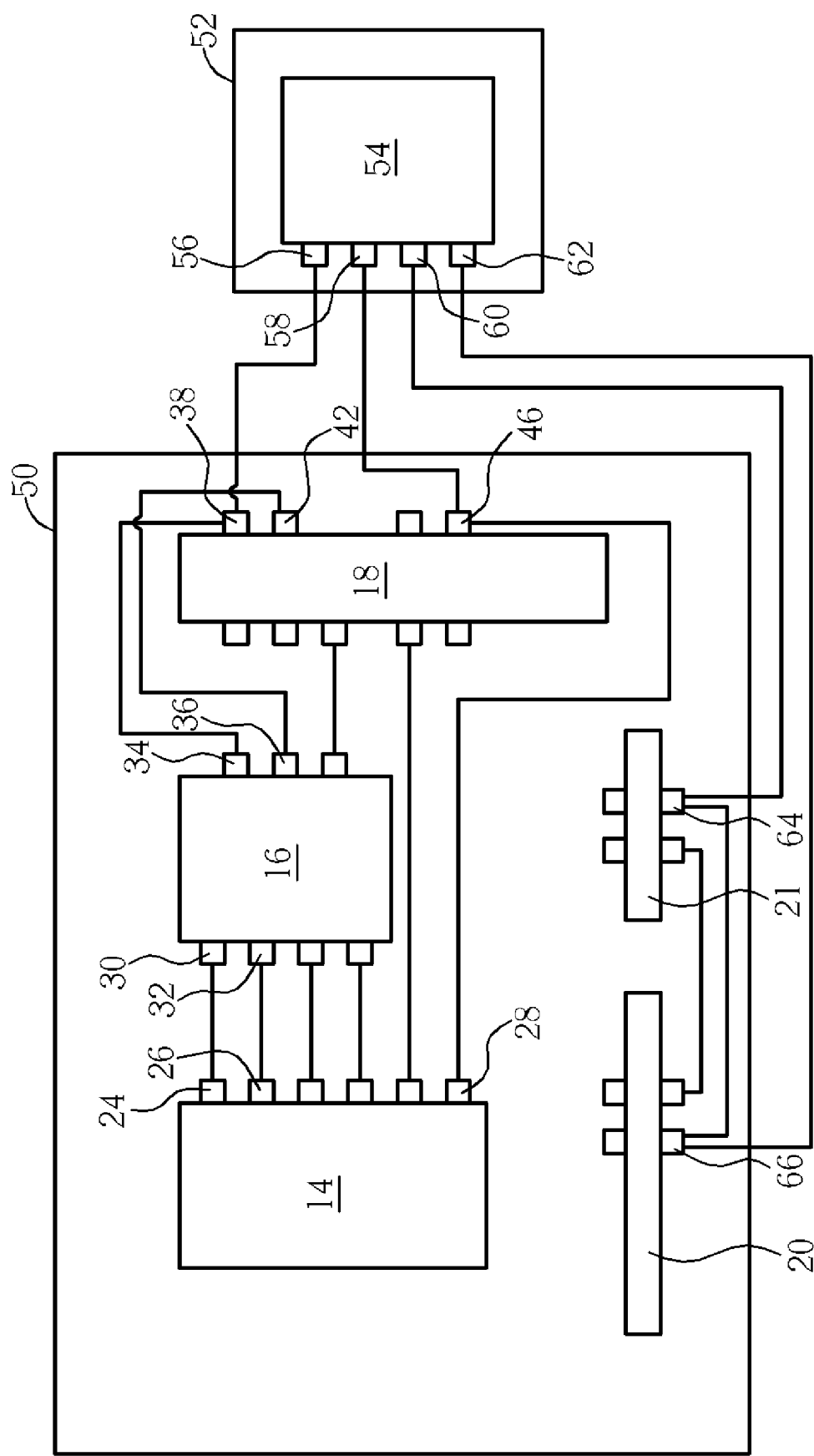
FIG. 4 is a perspective view of the PCBA in FIG. 3 and a test I/O module according to the present invention.

Please refer to FIG. 4. FIG. 4 is a perspective view of the PCBA 50 and a test I/O module 52 according to the present invention. After reading the description file of the PCBA 50 and determining the integrated circuits 14, 16 on the PCBA 50 are boundary scan integrated circuits, if the description file of the PCBA 50 shows that the pins 24, 28 of the integrated circuit 14 and the pins 30, 34 of the integrated circuit 16 are used to perform boundary scan, then the connector 18 will be determined as to be electrically connected with the test I/O module 52. And since the connectors 20, 21 are electrically connected, they will also be determined as to be electrically connected with the test I/O module 52. Then the auto test program generator will generate a wiring report, and the user can electrically connect the pins 56, 58, 60, 62 of the integrated circuit 54 on the test I/O module 52 to the pins 38, 46, 64, 66 of the connectors 18, 20, 21 on the PCBA 50 respectively according to the wiring report because the wiring report will correspond the pins 56, 58, 60, 62 to the pins 38, 46, 64, 66 respectively. Thus the integrated circuit 54 will neither leave any unused pin between two used pins nor exclude the connectors 20, 21 from testing. Since in the present invention, the auto test program generator determines which of the pins are used to perform boundary scan according to the wiring of the boundary scan integrated circuits, the integrated circuit 54 will not leave any unused pin to correspond to a pin such as the pin 42 of the connector 18. Thus the system resource will not be wasted.

Figure 5:
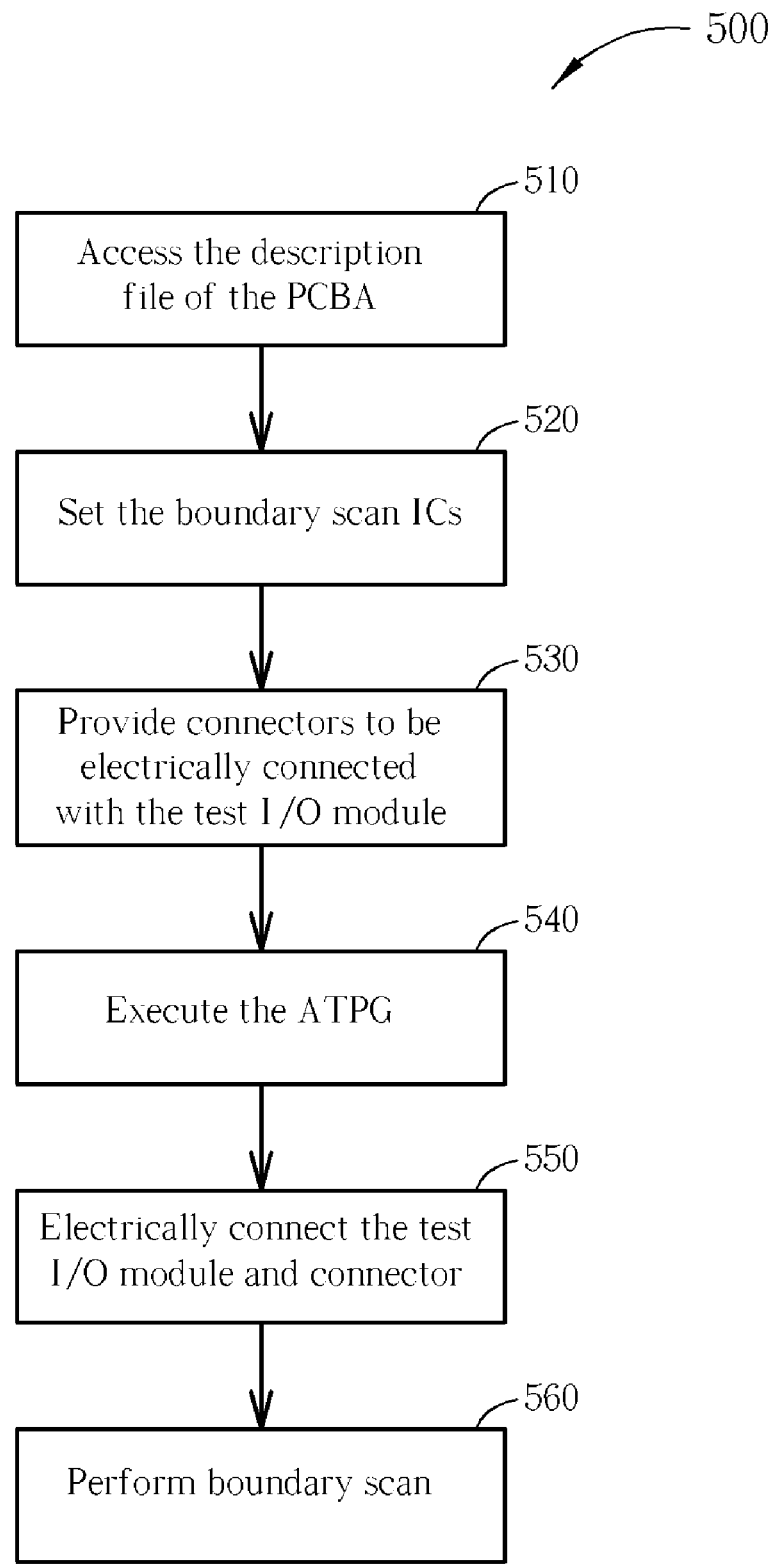
FIG. 5 is a flowchart of a boundary scan connector test method according to the first embodiment of the present invention.

Please refer to FIG. 5. FIG. 5 is a flowchart of a boundary scan connector test method 500 according to the first embodiment of the present invention. The boundary scan connector test method 500 is as follows:

Step 510: access the description file of the PCBA 50;

Step 520: set the boundary scan integrated circuits on the PCBA 50 to determine which of the pins on the PCBA 50 are relevant to boundary scan;

Step 530: provide connectors to be electrically connected with the test I/O module 52;

Step 540: execute the auto test program generator to generate a wiring report;

Step 550: a user electrically connects the pins on the test I/O module 52 to pins of the connectors 18, 20, 21 on the PCBA 50 according to the wiring report;

Step 560: perform boundary scan to the PCBA 50 through the test I/O module 52 to check if the PCBA 50 can function normally.

If the functions of the two connectors 20, 21 are to be test, the connectors 20, 21 can be provided in step 530 as to be electrically connected with the test I/O module 52 according to the description file of the PCBA 50 in step 510.

In this embodiment, the user did not link the pins of the connectors on the PCBA 50 with the pins of the integrated circuit 54 on the test I/O module 52 one by one before step 510, thus the wiring report generated in step 540 will link the pins of the integrated circuit 54 to the boundary scan pins of the connectors 18, 20, 21 on the PCBA 50 one by one, fully utilizing the pins of the integrated circuit 54.

Figure 6:
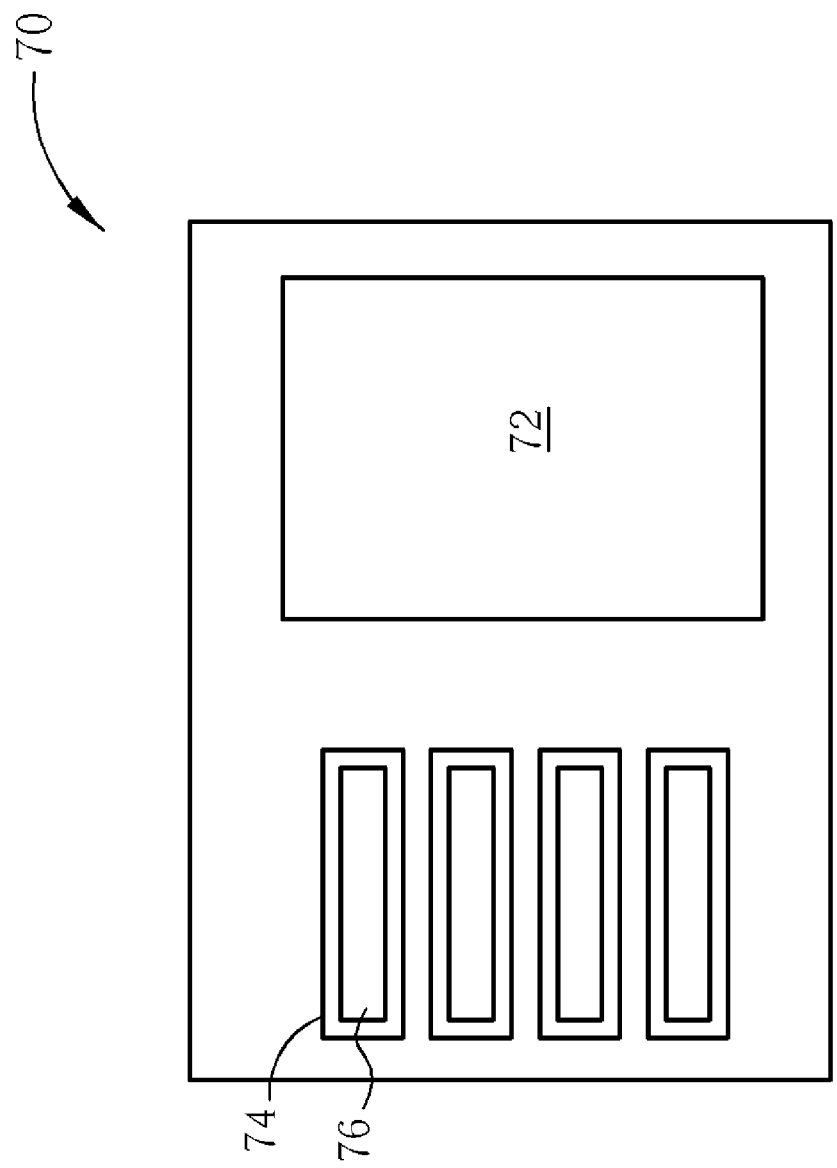
FIG. 6 is a perspective view of a Joint Test Action Group (JTAG) backplane according to the present invention.

Please refer to FIG. 6. FIG. 6 is a perspective view of a Joint Test Action Group (JTAG) backplane 70 according to the present invention. The JTAG backplane 70 comprises a backplane controller 72 and a plurality of slots 74. Each of the slots 74 is inserted with a test I/O module 76. The backplane controller 72 will link the test I/O modules 76 on the slots 74 according to a hardware configuration report to form a Boundary Scan chain.

Figure 7:
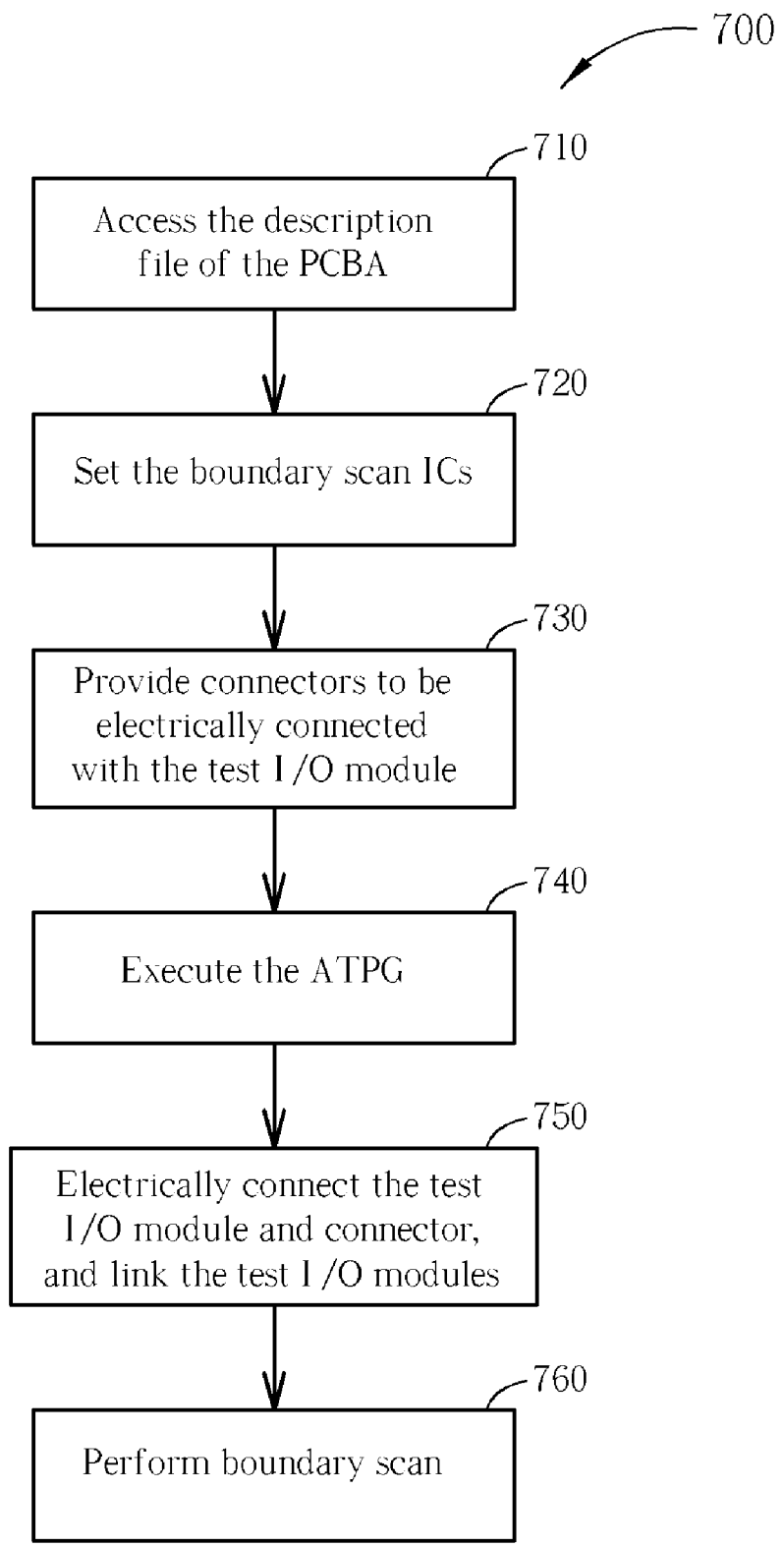
FIG. 7 is a flowchart of a boundary scan connector test method according to the second embodiment of the present invention.

Please refer to FIG. 7. FIG. 7 is a flowchart of a boundary scan connector test method 700 according to the second embodiment of the present invention. The boundary scan connector test method 700 is as follows:

Step 710: access the description file of the PCBA 50;

Step 720: set the boundary scan integrated circuits on the PCBA 50 to determine which of the pins on the PCBA 50 are relevant to boundary scan;

Step 730: provide connectors to be electrically connected with the test I/O modules 76;

Step 740: execute the auto test program generator to generate a wiring report and a hardware configuration report;

Step 750: a user electrically connects the pins on the test I/O modules 76 to the pins of the connectors 18, 20, 21 on the PCBA 50 according to the wiring report, the backplane controller 72 links the test I/O modules 76 on the JTAG backplane 70 according to the hardware configuration report;

Step 760: perform boundary scan to the PCBA 50 through the test I/O modules 76 to check if the PCBA 50 can function normally.

In this embodiment, the auto test program generator will generate the wiring report and the hardware configuration report in step 740. The hardware configuration report will inform the backplane controller 72 which of the test I/O modules 76 should be linked. If a single test I/O module 76 has sufficient pins to electrically connect with the boundary scan pins of the connectors on the PCBA 50, then the hardware configuration report will inform the backplane controller 72 not to link test I/O modules 76 on the backplane 70. If three test I/O modules 76 are required to provide sufficient pins to electrically connect with the boundary scan pins of the connectors on the PCBA 50, then the hardware configuration report will inform the backplane controller 72 to link the three test I/O modules 76. If the pins of all test I/O modules 76 on the JTAG backplane 70 are not enough to electrically connect with the boundary scan pins of the connectors on the PCBA 50, then the hardware configuration report will inform a Multiple Scan Path Linker to link a plurality of JTAG backplanes 70 and inform the backplane controllers 72 of the JTAG backplanes 70 to link sufficient number of test I/O modules for electrically connecting with the boundary scan pins of the connectors on the PCBA 50.

In the embodiments of the present invention, the user does not need to determine and select connectors or pins of connectors might be relevant to boundary scan ahead of time. All pins of connectors might be relevant to boundary scan are determined by reading the description file of the PCBA. Thus the wiring report can correspond the pins of the integrated circuit on the test I/O module to the pins of connectors might be relevant to boundary scan in sequence. Therefore the pins of the integrated circuit on the test I/O module will be fully utilized and no pin will be left unlinked between two linked pins of the integrated circuit on the test I/O module.

Those skilled in the art will readily observe that numerous modifications and alterations of the device and method may be made while retaining the teachings of the invention.

What is claimed is:

1. A boundary scan connector test method comprising:
   accessing a description file of a printed circuit board assembly (PCBA);
   setting a boundary scan integrated circuit (IC) on the PCBA to determine pins related to boundary scan on the PCBA;
   providing a connector on the PCBA to be electrically connected with a test input/output (I/O) module;
   executing an auto test program generator to generate a wiring report; and
   after pins on the test I/O module and pins of the connector on the PCBA are electrically connected according to the wiring report, performing a boundary scan for the PCBA through the test I/O module to check if the PCBA is normal.

2. The method of claim 1 further comprising electrically connecting a plurality of connectors on the PCBA through traces.

3. A boundary scan connector test method comprising:
   accessing a description file of a printed circuit board assembly (PCBA);
   setting a boundary scan integrated circuit (IC) on the PCBA to determine pins related to boundary scan on the PCBA;
   providing connectors on the PCBA to be electrically connected with test input/output (I/O) modules of a Joint Test Action Group (JTAG) backplane;
   executing an auto test program generator to generate a wiring report and a hardware configuration report;
   a backplane controller of the JTAG backplane linking a plurality of test I/O modules on the JTAG backplane according to the hardware configuration report; and
   after pins on the linked test I/O modules and pins of the connectors on the PCBA are electrically connected according to the wiring report, performing a boundary scan for the PCBA through the linked test I/O modules to check if the PCBA is normal.

4. The method of claim 3 further comprising electrically connecting a plurality of connectors on the PCBA through traces.

5. A boundary scan connector test method comprising:
   accessing a description file of a printed circuit board assembly (PCBA);
   setting a boundary scan integrated circuit (IC) on the PCBA to determine pins related to boundary scan on the PCBA;
   providing connectors on the PCBA to be electrically connected with test input/output (I/O) modules of Joint Test Action Group (JTAG) backplanes;
   executing an auto test program generator to generate a wiring report and a hardware configuration report;
   a Multiple Scan Path Linker linking a plurality of JTAG backplanes;
   backplane controllers of the linked JTAG backplanes linking a plurality of test I/O modules on the linked JTAG backplanes according to the hardware configuration report; and
   after pins on the linked test I/O modules and pins of the connectors on the PCBA are electrically connected according to the wiring report, performing a boundary scan for the PCBA through the linked test I/O modules to check if the PCBA is normal.

6. The method of claim 5 further comprising electrically connecting a plurality of connectors on the PCBA through traces.

* * * * *